July 7, 1970   J. MÜLLER   3,518,743
CLAMPING DEVICE FOR SHIFTABLE MACHINE TOOL STRUCTURAL MEMBERS
Filed July 11, 1968

INVENTOR
JOHANN MÜLLER

United States Patent Office 3,518,743
Patented July 7, 1970

3,518,743
CLAMPING DEVICE FOR SHIFTABLE MACHINE TOOL STRUCTURAL MEMBERS
Johann Müller, Munich, Germany, assignor to Friedrich Deckel Prazisions Mechanik & Maschinenbau, Munich, Germany, a firm of Germany
Filed July 11, 1968, Ser. No. 744,094
Claims priority, application Austria, July 24, 1967, A 6,856/67
Int. Cl. B23p *19/04*
U.S. Cl. 29—200                                        9 Claims

ABSTRACT OF THE DISCLOSURE

An elongated clamping member for a shiftable member such as a work table on a machine tool comprising one longitudinal edge firmly connected to the shiftable member and a second longitudinal edge portion having a T-slot clamping groove connected to the first longitudinal edge by a resilient web portion, whereby upon tightening of bolts stationary with the machine tool and having head portions slidably engaged in the T-slot, the web portion is flexed to provide a friction connection between the second longitudinal edge portion and the machine tool to clamp the shiftable member to the machine tool.

BACKGROUND OF THE INVENTION

This invention is directed to a clamping device assembly to secure shiftable members such as slides, work tables, rotary work tables, etc., in selected adjusted positions on the stationary part of a machine tool to which the member is connected for shifting movement. In the past, such shiftable members have been clamped to the stationary machine tools by an arrangement consisting of one or more bolts threadably connected into the stationary machine part and positioned with a portion of the bolt heads engaging over the free longitudinal clamping edge of the shiftable member. The bolts serve as the clamping members and upon tightening against the clamping edge function as clamping force-producing devices tending to draw the clamping edge of the shiftable member toward the stationary machine part. However, with this arrangement the load on the clamping bolts is unsymmetrical because only a portion of the heads are bearing against the clamping edge, and this unsymmetrical loading has in the past caused jamming of the bolts in the bores in the stationary machine part into which the bolts are threadably engaged. This unsymmetrical loading is caused by the fact that only a small part of the bolt force is exerted on the clamping edge of the shiftable member since only a portion of the bolt heads overlie and exert force on the clamping edge to convert the bolt force into friction force between the shiftable member and the stationary machine part.

More favorable distribution of forces is obtained in clamping devices that are used for engaging in the T-slots of machine tool work tables. In such clamping devices, such as used for clamping a workpiece on the work table, the bolts which engage in the T-slot are completely symmetrically stressed when tightened, since opposite edges of the bolt heads engage the T-slot and the bolt axis remains aligned with the axis of the respective bore. With this arrangement the entire tensioning of the bolts is utilized for producing frictional clamping forces.

SUMMARY OF THE INVENTION

To secure shiftable machine tool structural members, such as slides, longitudinally shiftable work tables, rotary work tables, and the like, on a stationary machine stand or part, clamping devices are used in which the clamping force is applied at right angles to the slip plane of the shiftable member and this clamping force is applied to an elongated clamping member which in the case of a longitudinal slide or longitudinally shiftable work table is substantially rectangular in shape, and in the case of a rotary work table it is arcuate in shape. The elongated clamping member is rigidly connected along one longitudinal edge portion to the shiftable member, with the clamping member positioned between the shiftable member and the stationary machine part. The opposite or free longitudinal edge portion of the elongated clamping member is connected parallel to the first longitudinal edge by a resilient web portion that is resiliently deformable in the direction of the clamping force. A longitudinally extending T-slot is provided in the free longitudinal edge portion the aperture of which faces toward the stationary machine part. The head portion of one or more conventional T-slot bolts connected on the stationary machine part extends into the T-slot and upon tightening the nuts on the T-slot bolts, because of the resilience or springiness of the web portion, the lower face of the free longitudinal edge portion is drawn by the bolt clamping force into frictional engagement with the stationary machine part. This arrangement results in the fixed stationary machine part remaining substantially free from any load in the direction of the clamping force and the shiftable machine part is retained in the selected position on the stationary machine part only by the frictional forces which result in the slip plane between the lower face of the free longitudinal edge portion and the stationary machine part as a result of the clamping force and the flexing of the web portion.

Further features of the invention will emerge from the following description, in conjunction with the accompanying drawings, of exemplified embodiments of the invention.

DESCRIPTION OF THE PREFERRED EMBODIMENTS

Figure 1:
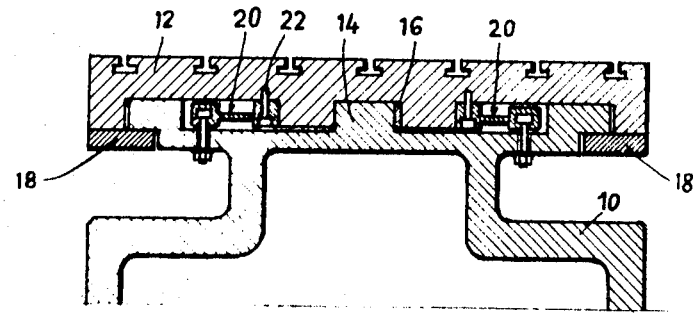
FIG. 1 is a cross sectional view of a rectilinearly guided machine tool table on a stationary machine tool part, showing the present invention.
Figures 3, 4:
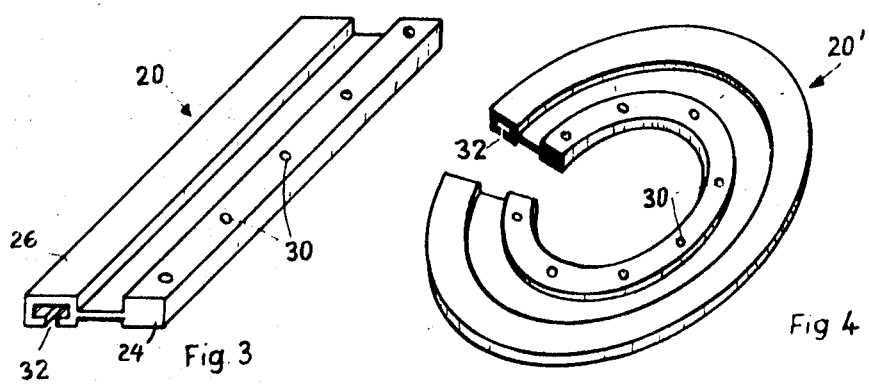
FIG. 3 is a perspective view on a different scale from FIGS. 1 and 2, showing the elongated clamping member of the clamping device of the invention, for a rectilinearly guided shiftable member as shown in FIG. 1.
FIG. 4 is a perspective view of an arcuate elongated clamping member of the clamping device of the invention for a rotary work table.
Figure 2:
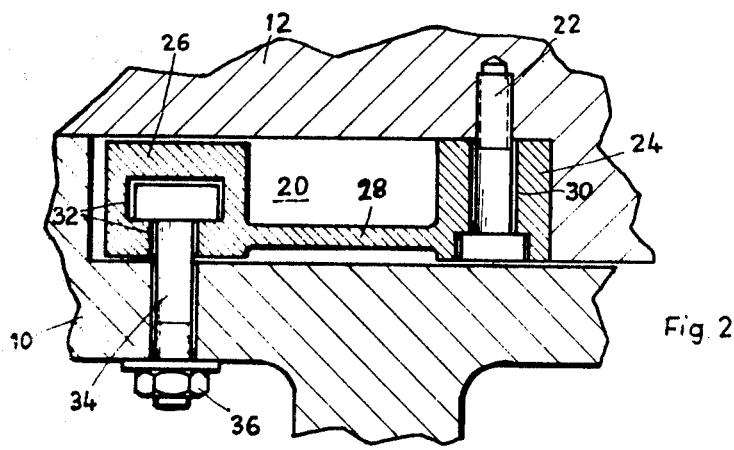
FIG. 2 is an enlarged cross sectional view of a fragmentary portion of FIG. 1, showing the clamping device of the invention in greater detail.

Referring to FIGS. 1, 2 and 3 of the drawings, a rectilinearly guided work table 12 is longitudinally shiftably guided in a direction normal to the plane of the drawing of FIG. 1, on a stationary machine tool part or frame 10. An upstanding longitudinally extending guideway 14 is provided on the stationary frame 10 and this guideway is engaged by a complementary longitudinal recess in the lower surface of the work table to provide guidance of the work table in the slip direction, longitudinally of stationary frame 10 and parallel with guideway 14. Guideway 14 is adjusted free from play in the horizontal plane by a splint part 16, and the work table is maintained free from play in the vertical plane by cover strips 18 connected to opposite longitudinal edges of the table and overlapping the undersurfaces of the opposite longitudinal edges of the stationary machine frame.

Two elongated clamping members or bands 20 are fastened to the underside of table 12 on either side of the narrow guideway 14 by means of bolts 22. The clamping bands consist of a pair of longitudinal edge portions 24 and 26 connected to each other by a flat flexible or resilient web portion 28. For clamping devices for use in heavy duty applications the longitudinal edge portions consist of two rails 24 and 26 arranged parallel to each other with web portion 28 being integral therewith.

A plurality of holes 30 for the through-bolts 22 are provided in rail 24 and these bolts rigidly connect rail 24 to the shiftable structural member or work table 12. The opposite rail 26 contains an open T-bolt 32 extending parallel in the rail, and the slot aperture of which opens on the lower surface of rail 26 so as to face toward the stationary machine tool frame 10.

The bottom surface of rail 26 is slightly spaced from the adjacent upper surface of stationary frame 10 in the unclamped position of the clamping device of the invention as shown in FIGS. 1 and 2. The heads of T-slot bolts 34 are slidably engaged into the T-slot 32 of rail 26. The T-slot bolts 34 extend through bores in the stationary machine frame 10 and are retained therein by nuts 36 so that the bolts 34 are stationary with frame 10 and the heads of the bolts slide in T-slot 32 as table 12 is moved longitudinally of frame 10 on the guideway 14.

When the table 12 is moved to the desired position, it is clamped in that position by tightening nuts 36 which function to draw-down T-slot bolts 34, which in turn draw-down rail 26 by flexing web portion 28. The bottom surface of rail 26 on both sides of the T-slot opening are pressed against the upper surface of frame 10 to produce a friction clamping force in the slip plane between the bottom of rail 26 and frame 10. The entire force of bolts 34 is utilized for producing the frictional clamping force by which table 12 is fixed in position relative to frame 10, since web portion 28 flexes and since opposite sides of the heads of bolts 34 engage the T-slot so that the tensioning of the bolts by nuts 36 is completely symmetrical. The resilient deformation of web portion 28 of clamping band 20, upon tightening the bolts 34, has no effect on table 12 since web portion 28 flexibly absorbs the deformation and thus transfers no clamping stresses to table 12. When it is desired to move the work table to a new position, nuts 36 are loosened, causing resilient web portion 28 to again move rail 26 into spaced relation with the upper surface of stationary frame 10, thus removing all frictional clamping forces.

For lighter weight constructions, the T-slot 32 in clamping band 20 can be formed by folding the free end of the sheet material of which the band is composed into the form of the T-slot. This type of clamping band is adequate for machine tools in which only slight stresses are encountered.

For rotary work tables and the like, the construction of the clamping device of the invention is substantially the same, except that the elongated clamping member or band is arcuate in shape as shown in FIG. 4, and has somewhat the appearance of a split ring. The operation of the clamping band is the same as for a rectangular clamping band.

T-slot bolts, as shown, are not the only members which will operate in the clamping device of the invention, since tensioning devices which are operated by means of eccentrics, or toggle joints, are just as suitable for use with the elongated clamping bands, and hydraulic or magnetic force producers may also be used in lieu of the T-slot bolts, if they terminate in a structural member shaped similar to the head of a T-slot bolt so as to be able to symmetrically engage in the T-slot of the clamping band.

The terms and expressions which have been employed herein are used as terms of description and not of limitation, and there is no intention, in the use of such terms and expressions, of excluding any equivalents of the features shown and described or portions thereof but it is recognized that various modifications are possible within the scope of the invention claimed.

I claim:

1. A clamping device for clamping a shiftable machine tool member in selected position on a stationary machine part on which it is guided, comprising an elongated clamping member having a first longitudinal edge portion and a second longitudinal edge portion, a substantially resilient portion connecting said first and second longitudinal edge portions, said first longitudinal edge portion connected to said shiftable machine tool member, said second longitudinal edge portion having an open T-slot therein opening toward said stationary machine part and extending parallel with said second longitudinal edge portion, and adjustable clamp means connected to said stationary machine part and slidably engaged in said T-slot, whereby adjustment of said clamp means moves said second longitudinal edge portion into friction contact with said stationary machine part to clamp said shiftable machine tool member in selected position.

2. A clamping device as set forth in claim 1, in which said second longitudinal edge portion consistutes a free edge disposed in spaced relation with said stationary machine part in the unclamped position of said device.

3. A clamping device as set forth in claim 1, in which said resilient portion connects said first and second longitudinal edge portions substantially throughout the lengths thereof.

4. A clamping device as set forth in claim 1, in which said first longitudinal edge portion, said second longitudinal edge portion and said substantially resilient portion are unitary.

5. A clamping device as set forth in claim 4, in which said first and second longitudinal edge portions comprise parallelly spaced enlarged body portions, and said resilient portion is a relatively thin integral web portion.

6. A clamping device as set forth in claim 1, in which said first and second longitudinal edge portions comprise first and second substantially rectangular rail members respectively, said T-slot contained in said second rail members, and said substantially resilient portion comprising a resiliently deformable web connecting said rail members.

7. A clamping device as set forth in claim 6, in which said rail members have bottom surfaces in relatively close proximity to said stationary machine part, and said web connects said rail members adjacent the bottom surfaces thereof.

8. A clamping device as set forth in claim 3, in which said clamping member formed by said first and second longitudinal edge portions and said resilient portion is arcuate in shape.

9. A clamping device as set forth in claim 1, in which said adjustable clamp means comprise a plurality of T-slot bolts having head portions engaged in said T-slot and nut members adjustable to draw said head portions toward said stationary machine part.

References Cited

UNITED STATES PATENTS 1,930,567  10/1933  Shaw _____ 90—58
2,486,075  10/1949  Strom _____ 29—1

CHARLES W. LANHAM, Primary Examiner

BIRUTE J. MUSTAIKIS, Assistant Examiner